United States Patent [19]

Kolakowski et al.

[11] 4,267,134
[45] May 12, 1981

[54] METHOD AND APPARATUS FOR SMOOTHING FOAMED PLASTIC CORE PANELBOARD SURFACE

[75] Inventors: Richard A. Kolakowski, Northford; Stephen A. Knis, Meriden, both of Conn.

[73] Assignee: The Upjohn Company, Kalamazoo, Mich.

[21] Appl. No.: 77,984

[22] Filed: Sep. 24, 1979

[51] Int. Cl.³ ............................................. B29D 27/04
[52] U.S. Cl. .................................. 264/46.2; 264/216; 264/DIG. 84; 425/224; 425/817 C
[58] Field of Search .............. 264/DIG. 84, 46.2, 216; 425/224, 817 C

[56] References Cited

U.S. PATENT DOCUMENTS

| | | | |
|---|---|---|---|
| 2,841,205 | 7/1958 | Bird | 264/46.2 |
| 3,215,581 | 11/1965 | Carlson et al. | |
| 3,240,846 | 3/1966 | Voelker | 264/46.2 |
| 3,354,503 | 11/1967 | Joseph et al. | 264/46.2 X |
| 3,551,945 | 1/1971 | Eyberg et al. | |
| 3,553,300 | 1/1971 | Buff | 264/DIG. 84 |
| 3,574,802 | 4/1971 | Hinds et al. | |
| 3,775,522 | 11/1973 | Auge | 264/46.2 |
| 3,837,771 | 9/1974 | Kolakowski et al. | |
| 3,984,195 | 10/1976 | Del Carpio | 264/DIG. 84 |
| 4,043,719 | 8/1977 | Jones | |
| 4,097,210 | 6/1978 | Romanillos | 264/DIG. 84 |
| 4,128,611 | 12/1978 | Kolakowski et al. | |
| 4,150,075 | 4/1979 | Schmitzer et al. | 264/46.2 X |

FOREIGN PATENT DOCUMENTS

| | | | |
|---|---|---|---|
| 58 | 12/1978 | European Pat. Off. | 264/DIG. 84 |
| 2449107 | 4/1976 | Fed. Rep. of Germany | 264/46.2 |

*Primary Examiner*—Philip Anderson

[57] ABSTRACT

A method and apparatus in a panelboard processing line is disclosed for controlling the application of smoothing pressure to a facing sheet of a laminate comprising at least one such sheet and a layer of plastic foam. Smoothing pressure is applied to the facing sheet during continuous production of the laminate in a conventional nip-roll, free-rising foam panelboard system. To this end, provision is made for adjustably suspending a belt-like member generally parallel to, but in variably spaced relation above, the processing line at a region downstream of the conventional nip-roll in the typical free-rising foam system. The belt-like member is flexible along its longitudinal axis but is relatively stiff transversely thereof, and is so suspended as to produce a depending loop or sag intermediate its ends. Drag contact by portions of the belt member with the facing sheet of the panelboard is controlled by adjusting the suspension points of the belt to position the sag of the belt at selected locations relative to the rise profile of the developing foam as the laminate is advanced along the processing line.

8 Claims, 2 Drawing Figures

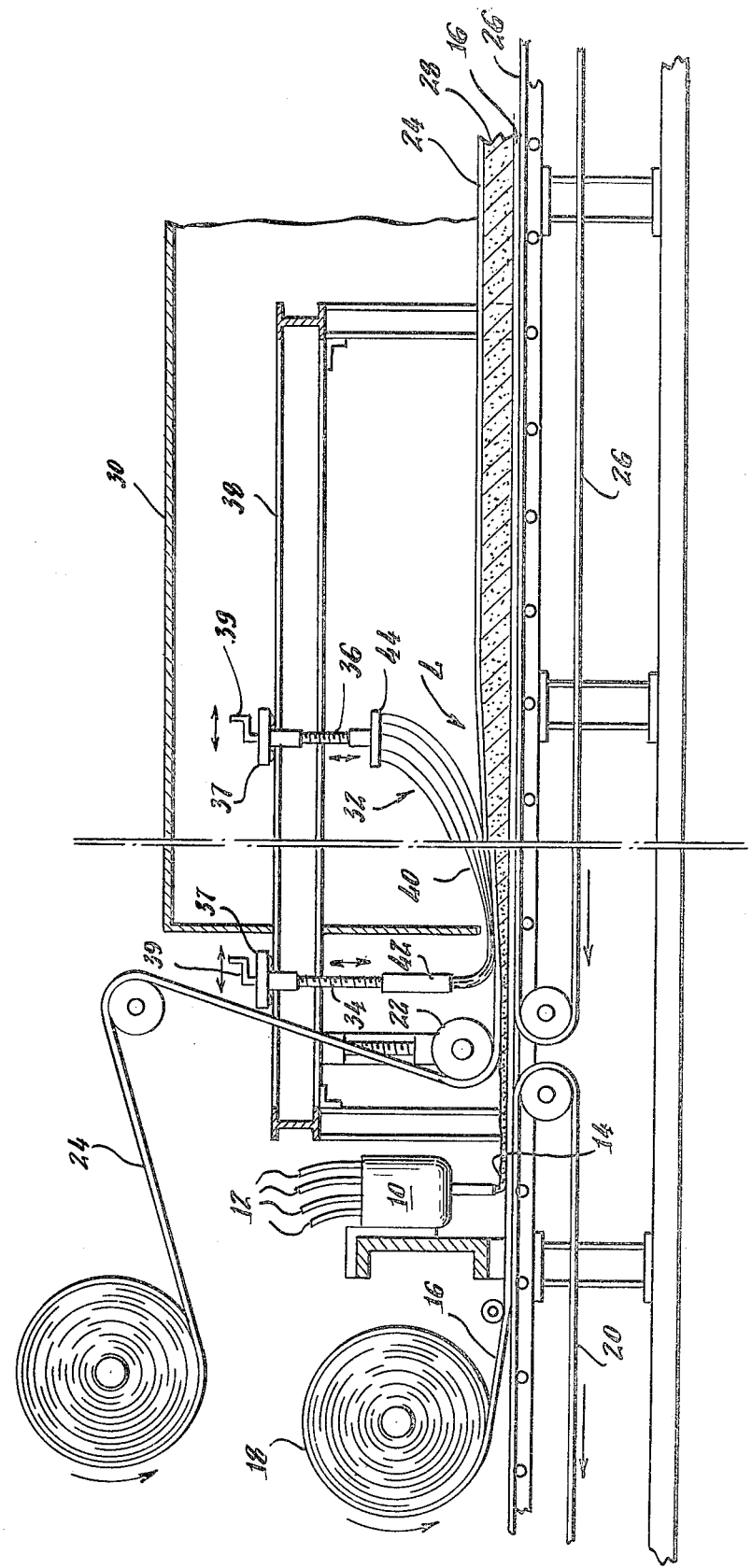

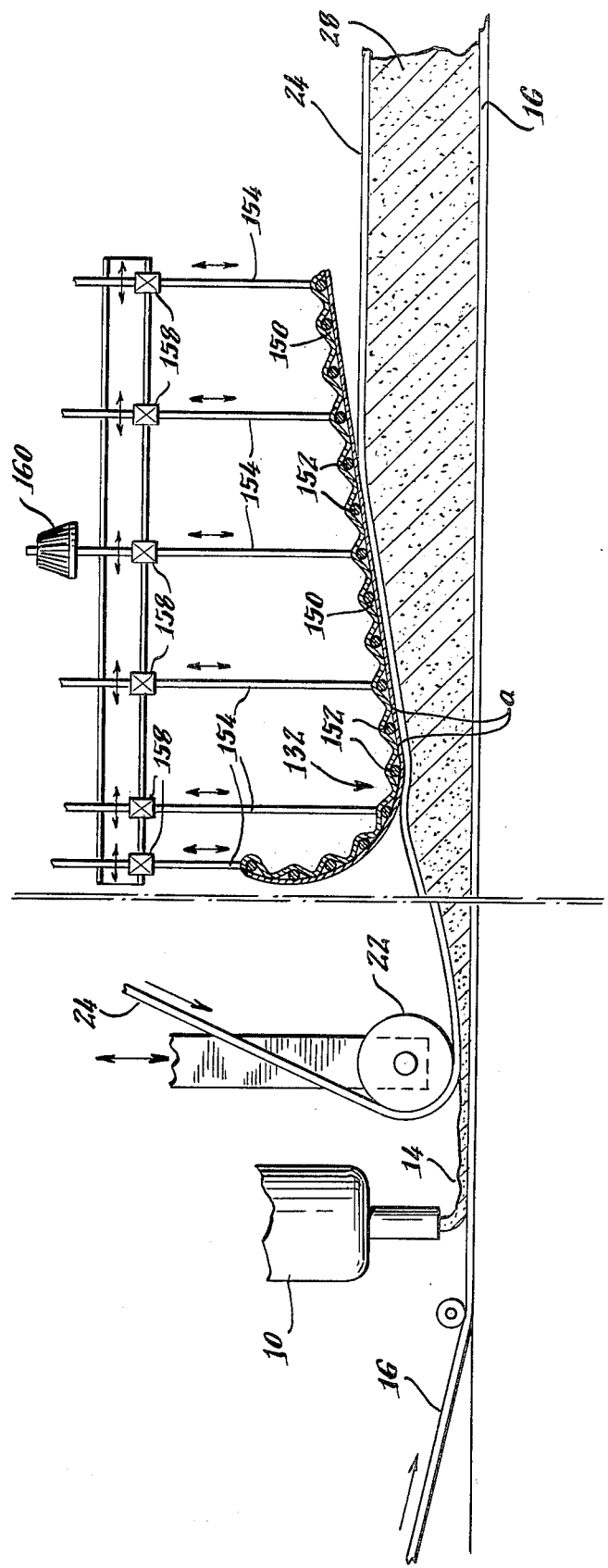

METHOD AND APPARATUS FOR SMOOTHING FOAMED PLASTIC CORE PANELBOARD SURFACE

BACKGROUND OF THE INVENTION

1. Field of the Invention

In commercial production of panelboard laminates in continuous lengths, more especially those having a polymer foam core sandwiched between facing sheets intimately bonded thereto, difficulty is encountered in obtaining a smooth, planar condition of the upper facing sheet so that it is free of waves, wrinkles and similar imperfections. The present invention is directed to providing a method of, and apparatus for, improving the operation of a conventional nip-roll, free-rising, polymer foam core panelboard processing line to obtain a smooth, planar, surface on the board.

2. Description of the Prior Art

It is well known to produce laminates having a polymer foam core and opposed facing sheets, using continuous, conveyor-like apparatus. Many arrangements are used commercially for this which generally involve advancing a bottom sheet of flexible facing material such as paper, plastic film, metal foil, sheet metal and the like along a conveyor surface, then depositing on that sheet a reactive liquid polymer mix which foams as it ages during forward progress along the conveyor, gradually rising into a blanket or block of rigidified, adherent foam upon completion of the aging process. In the production of double-faced laminate, the upper facing sheet is applied to the surface of the foam mix immediately after lay-down of the mix on the lower sheet, so that the upper facing sheet also becomes bonded to the surface of the foam core as the developing foam produces a rise profile during forward travel along the conveyor.

In order to produce a smooth, unwrinkled, planar face on the laminate, as well as to control the ultimate thickness of the finished product, pressure rolls or platens are conventionally provided between which the foam core/facing sheet laminate is passed as it progresses along the processing line. This is illustrated for example in U.S. Pat. Nos. 3,215,581 and 3,837,771 where the sandwich of opposed facing sheets and polymer foam core is advanced through a curing oven by opposed continuous slat conveyors. These contact the upper and lower surfaces of the laminate and are adjusted toward and away from each other to control the pressure applied to the developing panelboard during the cure process. This controls the resulting thickness of the finished board, both widthwise and lengthwise of the panel. The development of unit pressures due to foam rise over the relatively large areas of the developing board requires slat conveyor apparatus of heavy construction, and accordingly it is expensive to construct as well as cumbersome to operate.

A somewhat similar arrangement is shown in U.S. Pat. No. 3,551,945, but there stationary calibration plates are substituted for the moving pressure slat conveyors. The spacing of the calibration plates is made adjustable, and they are also heated so that passage of the laminate between them helps to cure the foam as well as calibrate the ultimate thickness of the finished panelboard product. The arrangement necessarily involves considerable friction due to sliding of the facing sheets against the plates. U.S. Pat. Nos. 3,574,802 and 4,043,719 show much the same type of arrangement.

In a "free-rising" foam system, attempt is made to meter the amount of reactive liquid foam mix applied to the surface of the lower facing sheet such that the natural, uninhibited rise of the foam will result in the desired final thickness of the core with little or no subsequent application of slat conveyor or platen pressure required. The ultimate objective is to achieve maximum isotropicity of the developed foam cells to get optimum thermal and density properties of the finished product. An equally important objective is that of producing a product which is as nearly flat on both top and bottom faces as possible; i.e. a product of rectangular cross section. However the nature of the foam mix and of the chemical reaction which takes place between the facing sheets introduces conditions which are extremely difficult to control physically, particularly in continuous commercial production. Because of this, consistently uniform density and rectangular cross section are hard to obtain.

In prior bunstock processing systems, which bear some similarity to panelboard processing systems but differ essentially in terms of foam thickness to be dealt with, many devices are employed for ensuring rectangular cross section of the bun in order to minimize scrap or waste when the bun is slit for use in various finished products such as mattresses, cushions, etc. The devices employed include rollers, such as shown in U.S. Pat. No. 3,984,195, to push or press rising, incompletely gelled, foam into desired final bun configuration. Rigid drag panels such as that described in U.S. Pat. No. 4,128,611 have also been used. In the case of bunstock production, the relatively slow rate of conveyor travel (e.g., of the order of 1 foot per minute), plus the substantial height (thickness) of the developed bun (e.g. 2 to 2½ feet) and the substantial period of time to develope the full rise profile of the foam, make feasible the use of such prior foam shaping devices in those situations since there is room in the apparatus employed to physically place the shaping devices in appropriate position and to adjust their position to a desired point relative to the rise profile of the developing foam bun. That is, in a graphic plot of foam rise vs. time, where the time axis is represented by distance traveled along the conveyor, the rise profile from mix lay-down to fully developed foam height is typically spread out over an interval represented by 15 to 17 feet of conveyor travel.

A different situation exists, however, in producing panelboard laminates. Here the rate of conveyor travel is faster (on average, 10 feet or more per minute). In this case the foam development begins with lay-down of a thin layer of incipiently foamable liquid mix (approximately only one-thirtieth of the desired thickness of the final laminate). This developes to the total thickness (e.g., a maximum of 3 or 4 inches, and usually only one-half to one inch) needed for panelboard production and does so quite rapidly. In panelboard production the rise profile representing development of the foam is accordingly spread over only a few feet along the processing (conveyor) line. This generally makes it impossible or impractical to locate the prior pressure slats, rollers or large drag panels at the proper point or points relative to rise profile, and even more difficult to make adjustment of such placement for needed on-line corrections, because of their cumbersome form.

In panelboard production the amount of smoothing pressure applied also must be of a very low and precisely adjustable amount, due to the low total thickness at any time and relatively high mobility of the foam mix and developing foam. For example, should smoothing pressure be applied at a point in the rise profile where the developing foam is still very fluid (that is, inadequately gelled), the pressure applied simply causes backward squeezing of the liquid mix upstream of the conveyor without necessarily producing the desired planar configuration of the surface. Furthermore, because generally there is horizontal stratification in the foam development, increments of foam mix at the facing sheet interfaces tend to gell before interior increments of the mix. The interior portions thus can still flow and move about easily, while strata near the interfaces is restrained. This adversely affects uniformity of thickness and planarity in the finished laminate.

Another problem is that compression of the developing foam cell structure, if smoothing pressure is applied at the wrong stage of gel development, simply results in stressing the structure of individual cells rather than reorienting cell position in the core matrix. Cell structure stress results in impaired cell isotropicity, reducing desired physical properties of the finished product. Compression for smoothing purposes at the wrong point along the processing line, in other words at the wrong point on the time axis of the rise profile of the foam, may not even manifest itself until after production of the panelboard is completed, as the result of "plastic memory". This can become particularly troublesome under certain ambient conditions to which the foam may be exposed. Warping and surface wrinkling are the usual results here.

SUMMARY OF THE INVENTION

The invention is directed to solving the problems discussed above in providing a smooth, truly planar surface on a facing sheet/foamed plastic core laminate in a continuous panelboard processing system, wherein the desired uniformity of foam density and cell structure is still retained. In general, the invention comprises method and apparatus for commercially practical panelboard production lines in which, during the foam development under essentially free-rise condition after deposit of reactive liquid foam mix on an advancing lower facing sheet and passage through a nip-roll or equivalent metering device, a length of longitudinally flexible curtain or belt is draped from above the process line, and a loop portion is caused to sag into contact with the upper surface of the advancing foam core/facing sheet laminate. Provision is made for controlling the loop so that the point or region of its contact with the laminate surface occurs at the proper point along the processing line; that is, contact occurs at the proper point or region along the time axis of the rise profile of the developing foam core. A smoothing pressure is produced gravitationally by the weight of the loop and this weight is variably adjustable by the positioning of the supporting means of the loop. The problem of trying to find space, in the limited zone available along the processing line, for placement of heavy, complex or bulky smoothing devices of the type heretofore used is effectively reduced. The smoothing belt utilized in accordance with the invention is constrained to be flexible along its longitudinal axis only, as contrasted with its transverse or widthwise direction in which maximum stiffness is sought. In order to achieve this, as well as to provide appropriate pressure application, the belt may take several forms. That is, it may be composed of a number of plies of flexible sheet plastic, leather, rubber, etc., of successively shorter lengths, laminated together so that thickness and weight of the composite belt varies along the longitudinal direction. Alternatively, a flexible sheet of uniform thickness may be used, in which there are incorporated rods or other rigid shapes extending transversely and in parallely disposed relation along the belt, arranged either uniformly or progressively closer longitudinally of the conveyor travel. Progressively increasing the number of rods or other rigid shapes per unit length provides a belt having variable weight along its length. In either case, provision is made for adjusting the height of the supports at the ends of the belt as well as the spacing between them to enable positioning the loop contact with the panelboard at desired location.

Further understanding of the inventive concept, and of specific ways for implementing its use in commercial panelboard production, will be gained from the detailed description which follows of several arrangements.

DESCRIPTION OF THE DRAWINGS

FIG. 1 is a schematic view in side elevation, portions being cut away, of panelboard production line apparatus incorporating the invention; and FIG. 2 is a fragmentary schematic view of an apparatus similar to that of FIG. 1 but showing a variation in form of the smoothing member, the extent and curvature of the foam rise profile here shown being distorted for purposes of better illustration of the invention.

DETAILED DESCRIPTION OF THE INVENTION

In the panelboard processing line schematically shown in FIG. 1, several reactive liquid components of a foam mix are fed to low pressure (rotary) mixing head 10 by flexible fluid lines 12. Foam mixes suitable for this purpose are well known, as for example various polyurethane or isocyanurate compositions. Similarly, rotary type mixing heads for dispensing the mix are well known. See for example U.S. Pat. No. 3,924,837. The foam forming mix 14, which is initially very fluid at the lay-down point, is deposited on a continuously advancing lower web 16 of paper or other facing sheet material which is fed from a supply roll 18. Facing sheet 16 is supported on a belt conveyor 20 as it is advanced beneath mixing head 10, while the head is reciprocated transversely of the direction of travel of the facing sheet to effect distribution of the foam mix widthwise of the sheet. If desired belt conveyor 20 may be dispensed with, and facing sheet 16 supported directly upon a smooth stationary metal plate, and low pressure reciprocating mixing head 10 may be replaced by a high pressure reaction-injection mixing head of well-known commercial type.

Immediately downstream of the fluid mix lay-down point, lower facing sheet 16 with the mix thereon passes under a nip-roll 22. At this roll, an upper facing sheet 24 is trained about the lower periphery to bring it into spaced, confronting relation with lower sheet 16. Contact of upper sheet 24 is made with the mix, and the lower and upper facing sheets 16, 24 advance synchronously from there on, with the foam mix sandwiched between them. Advance of the facing sheet/foam mix laminate is effected by suitable downstream pulling means, such as a continuous belt conveyor 26 and driving means therefor, not shown. Nip-roll 22 is mounted for vertical adjustment toward and away from the conveyor surface to permit adjustment of the gap between the roll and conveyor surface, thus metering the amount of mix retained between the facing sheets. As mentioned above, in a free-rising foam system, the metering function of the nip-roll is adjusted to allow only sufficient mix to be retained such that, on full development of the rigidified foam, it achieves naturally the thickness finally desired with minimum application of shaping constraints. The developing foam exhibits a rise profile from lay-down point to full thickness or height which is represented in FIG. 1 by the upward curve of the top facing sheet 24 in the region immediately adjacent the downstream side of the nip-roll. The resulting "expanded" laminate L, which is essentially fully developed within 3 to 30 feet downstream of nip-roll 22 depending largely on through-put, mix formulation, curing oven temperature and conveyor rate, comprises top and bottom facing sheets 24 and 16, respectively, separated by but bonded to the developed cellular or foamed core 28. Typically the thickness or height of core 28 is about ½ to ¾ of an inch, although it may be as much as 3 or 4 inches in some laminate applications.

Curing of the foam is supplemented by passing the laminate L through a heated oven 30 prior to cutting the board into modular lengths by flying saws or shears, the latter not here illustrated but of conventional commercial available form.

The preceeding description has so far been directed to what is already known in the prior art. The invention lies in providing improvement in the capability of such a panelboard processing line to produce consistently smoother, more uniformly planar surfaced, panelboards, all with minimum interference to the free-rise of the foam.

To this end the invention employs a longitudinally flexible member 32 comprising a length of belt-like material which is suspended at its ends from vertically and horizontally adjustable supports 34, 36 mounted on a frame member 38 positioned above and generally parallel to conveyor 26. A pair of transports 37 is designed to permit individual independent movement horizontally along frame members 38, and each transport is provided with elevating means 39 for vertical adjustment of the supports 34, 36. Between its ends, belt 32 is free to flex downwardly under the influence of gravity to form a loop 40 which is adjusted by proper positioning of the supports to control contact with the upper facing sheet 24 of laminate L. This contact with the sheet is adjustable as to its longitudinal extent along the facing sheet; that is, from only a line contact to one extending over an area. In addition, the distance downstream of nip-roll 22 of the line or area contact is also adjustable, as by moving transports 37 along frame 38.

While belt 32 is freely flexible longitudinally, it is substantially stiff and inflexible transversely of its length, so that contact of loop 40 always produces a line (or area) contact extending evenly across the width of the laminate L. Transverse rigidity is achieved by making the thickness of belt 32 adequate for the purpose, or by using suitably stiff members 42, 44 for attachment of the belt to supports 34, 36. Supports 34, 36 are preferably employed in pairs, with one positioned at each corner of the belt so as to further ensure transverse stiffness. This latter arrangement also enables adjustment in height to be made at individual corners to achieve proper leveling and to control the thickness of the panelboard in cross section.

In FIG. 1, belt 32 is illustrated as being composed of multiple plies of sheet material, such as rubber, leather or plastic, with progressively shorter plies being laminated to produce a thickness at the downstream end substantially greater than at the upstream end. By positioning supports 34, 36 differently, sag 40 can be made to occur at points along the belt having different thickness. This will provide different degrees of stiffness (or weight) to the smoothing action imparted by contact of the belt with the facing sheet of laminate L.

In FIG. 2, a modified form of belt 132 is illustrated. This consists of a double layered flexible sheet, e.g. of heavy plastic, joined together along spaced transverse lines a to form pockets 150 which run across the belt in parallel spaced condition along its length. In each of pockets 150 there is inserted a stiff rod 152 or the like. Provision is made for supporting the opposite ends of rods 152 from suspension elements 154 to control the contouring of belt 132 by adjusting the length of the downwardly projecting portion of elements 154 below supporting frame member 156. The amount of extension is controlled by clamping blocks 158 which in turn may be horizontally adjustable along frame member 156. Certain of blocks 158 may also be set to allow their respective elements 154 to slide up (or down) within the block under the influence of foam rise at the subadjacent region of the belt. This may be under simply the gravitational load produced by that portion of the belt and suspension elements, or may be supplemented by weighting particular elements, as by weight 160. This arrangement provides for some greater control of the configuration of the belt than that produced solely by end suspension shown in FIG. 1.

Although specific embodiments of the present invention are described and illustrated above, it is to be understood that these are simply typical of a number of ways that can be employed to accomplish the objective.

What is claimed is:

1. In a method for improving planarity of the surface of panelboard composed of a foamed plastic core having a facing sheet thereon when produced in continuous manner on a conventional nip-roll, free-rising, foamed plastic core panelboard production line, the improvement which comprises draping above said production line, downstream of the nip-roll, and extending over a region of said production line corresponding to locations of less than full development of the foam in the panelboard being produced thereon, a non-advancing smoothing member comprising a length of longitudinally flexible, transversely stiff belt-like material, supporting said member at its ends to allow an intermediate portion thereof to sag by weight of gravity in the foam of a loop toward said facing sheet, and adjusting the location and area of contact between the sagging loop portion of said member and facing sheet in said region downstream of said nip-roll by changing the position of the supporting means at the ends of said member.

2. The method as defined in claim 1, which includes adjusting said supporting means at the ends of said member longitudinally toward and away from each other in a plane generally parallel to the plane of the laminate surface to change the location of the loop portion relative to the nip-roll.

3. The method as defined in claim 1, which includes adjusting said supporting means at the ends of said member toward and away from the plane of the panelboard to vary the area of contact with the laminate surface.

4. In apparatus for improving planarity of the surface of panelboard composed of a foamed plastic core having a facing sheet thereon when produced in continuous manner on a conventional nip-roll, free-rising, foamed plastic core panelboard production line, the improvement which comprises incorporating into said production line:

a smoothing member comprising a non-advancing length of longitudinally flexible, transversely stiff, belt-like material;

support means for said member at its opposite ends and suspending it above said production line to allow an intermediate portion thereof to sag by weight of gravity in the form of a loop toward said facing sheet at positions downstream of the nip-roll over a region of said production line corresponding to locations of less than full development of the foam in the panelboard being produced thereon; and means for adjusting said support means to position the ends of said smoothing member longitudinally and vertically relative to said production line to vary the location and area of contact between said intermediate portion of said smoothing member and panelboard facing sheet in said region downstream of the nip-roll.

5. The apparatus as defined in claim 4, wherein said smoothing member is of varying thickness along its longitudinal axis.

6. The apparatus as defined in claim 5, wherein said member is composed of multiple plies of material of progressively shorter length.

7. The apparatus as defined in claim 4, wherein said member includes parallel, spaced, rigid rods and pockets in which said rods are disposed extending transversely of its longitudinal axis to reinforce its stiffness transversely.

8. The apparatus as defined in claim 4, wherein said support means are individually adjustable toward and away from each other in a plane generally parallel to the plane of the panelboard, and each of said support means is also adjustable toward and away from the plane of said panelboard surface.

* * * * *